United States Patent [19]
Weisser et al.

[11] Patent Number: 5,988,605
[45] Date of Patent: Nov. 23, 1999

[54] ADJUSTABLE LENGTH GAS SPRING

[75] Inventors: Frank Weisser, Pegnitz; Herbert Wolf, Altdorf, both of Germany

[73] Assignee: Suspa Compart Aktiengesellschaft, Altdorf, Germany

[21] Appl. No.: 09/056,852

[22] Filed: Apr. 8, 1998

[30]     Foreign Application Priority Data

Apr. 9, 1997  [DE]  Germany ............................ 197 14 646

[51] Int. Cl.⁶ ...................................................... F16F 5/00
[52] U.S. Cl. .................. 267/64.12; 188/300; 188/322.16
[58] Field of Search ....................... 188/322.16; 267/120, 267/124, 64.12; 277/401, 408, 460, 461, 465, 552; 264/267, 273, 274

[56]             References Cited

U.S. PATENT DOCUMENTS

| | | | |
|---|---|---|---|
| 3,656,593 | 4/1972 | Bauer | 188/300 |
| 3,711,054 | 1/1973 | Bauer | 248/562 |
| 3,825,244 | 7/1974 | Bauer | 267/124 |
| 3,963,101 | 6/1976 | Stadelmann | 267/64.12 |
| 4,728,084 | 3/1988 | Bauer | 188/300 |
| 4,844,392 | 7/1989 | Bauer | 267/64.12 |
| 5,141,210 | 8/1992 | Bauer | 267/64.12 |
| 5,273,259 | 12/1993 | Bauer | 267/64.12 |
| 5,275,085 | 1/1994 | Hur | 91/170 R |
| 5,570,873 | 11/1996 | Bauer | 188/300 |
| 5,643,521 | 7/1997 | Nehm | 264/267 |

FOREIGN PATENT DOCUMENTS

| | | |
|---|---|---|
| 0 383 303 | 8/1990 | European Pat. Off. . |
| 18 12 282 | 6/1970 | Germany . |
| 39 04 585 | 8/1990 | Germany . |
| 40 09 035 | 9/1991 | Germany . |
| 41 14 226 | 11/1992 | Germany . |
| 42 36 151 | 4/1994 | Germany . |
| 44 26 846 | 12/1994 | Germany . |
| 44 20 914 | 12/1995 | Germany . |
| WO 95/32872 | 12/1995 | WIPO . |

*Primary Examiner*—Robert J. Oberleitner
*Assistant Examiner*—Hargobind S Sawhney
*Attorney, Agent, or Firm*—Browdy and Neimark

[57]             ABSTRACT

The valve of an adjustable length gas spring comprises a valve body which has two outside seals and two inside seals. The seals are applied integrally to the valve body by injection-molding.

10 Claims, 2 Drawing Sheets

ADJUSTABLE LENGTH GAS SPRING

BACKGROUND OF THE INVENTION

1. Field of the Invention

The invention relates to an adjustable length gas spring comprising a housing formed by an exterior cylinder and an interior cylinder and with a first end and a second end and a central longitudinal axis, the exterior cylinder having an inside wall and the interior cylinder having an inside wall; an overflow channel formed between the interior cylinder and the exterior cylinder; a piston disposed displaceably in the interior cylinder and dividing the interior cylinder into a first housing chamber and a second housing chamber, a piston rod mounted on the piston and disposed concentrically of the axis and extending through the first housing chamber and out of the housing; a piston rod guide and seal unit disposed at the first end of the housing and externally closing the housing chamber; at least one passageway permanently connecting the first housing chamber with the overflow channel; a valve disposed at the second end of the housing and closing the second housing chamber and provided for optional connection of the second housing chamber with the overflow channel, the valve having a valve body, which is disposed in the exterior cylinder by an outer surface concentric of the axis; which comprises a centering collar concentric of the axis for centering and holding the interior cylinder; which, in the outer surface, comprises an annular groove with a first outside seal that rests on the inside wall of the exterior cylinder; which, in the centering collar, comprises a second annular groove with a second outside seal that rests on the inside wall of the interior cylinder; which comprises a valve channel concentric of the axis; which comprises an annular groove with a first inside seal, the annular groove being open towards the valve channel and spaced from the second housing chamber; which comprises an annular groove with a second inside seal, the annular groove being open towards the valve channel and adjacent to the second housing chamber; which comprises a passageway permanently connected with the overflow channel on the one hand and with the valve channel on the other hand and opening into the valve channel between the first inside seal and the second inside seal; and which comprises a valve pin which is displaceable in the valve channel in the direction of the axis towards the second housing chamber, and which rests sealingly on the first inside seal and on the second inside seal when the valve is closed, and which bridges the second inside seal and connects the valve channel with the second housing chamber when the valve is opened.

2. Background Art

Gas springs of the generic type as known for instance from U.S. Pat. No. 3,656,593 comprise a valve having a valve body which, on its outside, is provided with two annular grooves for the accommodation of two outside seals, and with two annular grooves that are open towards the valve channel and house two inside seals. Mounting these four annular seals is extraordinarily complicated.

EP 0 383 303 A2 has taught to embody a valve for a gas spring of the generic type in such a way that a material suitable for sealing purposes is injection-molded entirely around a valve body, the function of the four seals mentioned thus being attained. A basic problem resides in that defined guidance of the valve pin and also defined guidance between the valve and the exterior cylinder and the interior cylinder is no longer achievable.

SUMMARY OF THE INVENTION

It is an object of the invention to embody a gas spring of the generic type such that the manufacture of the valve is strongly simplified, accompanied with the maintenance of high reliability of operation.

According to the invention, this object is attained by the features wherein the annular groove lodging the first outside seal is connected with the annular groove lodging the first inside seal by at least one first injection channel; wherein the annular groove lodging the second outside seal is connected with the annular groove lodging the second inside seal by at least one second injection channel; wherein the first outside seal and the first inside seal are connected by a first web in the at least one first injection channel; and wherein the second outside seal is connected with the second inside seal by a second web in the at least one second injection channel. The measures according to the invention ensure that on the one hand all the seals are applied to the valve body in a single injection-molding job, but that on the other hand, towards the valve channel and externally, only the annular seals exist so that externally, the valve body which consists of a rigid material can still fulfill its bearing and centering functions.

Further features, advantages and details of the invention will become apparent from the ensuing description of an exemplary embodiment, taken in conjunction with the drawing.

DESCRIPTION OF THE PREFERRED EMBODIMENT

Figure 1:
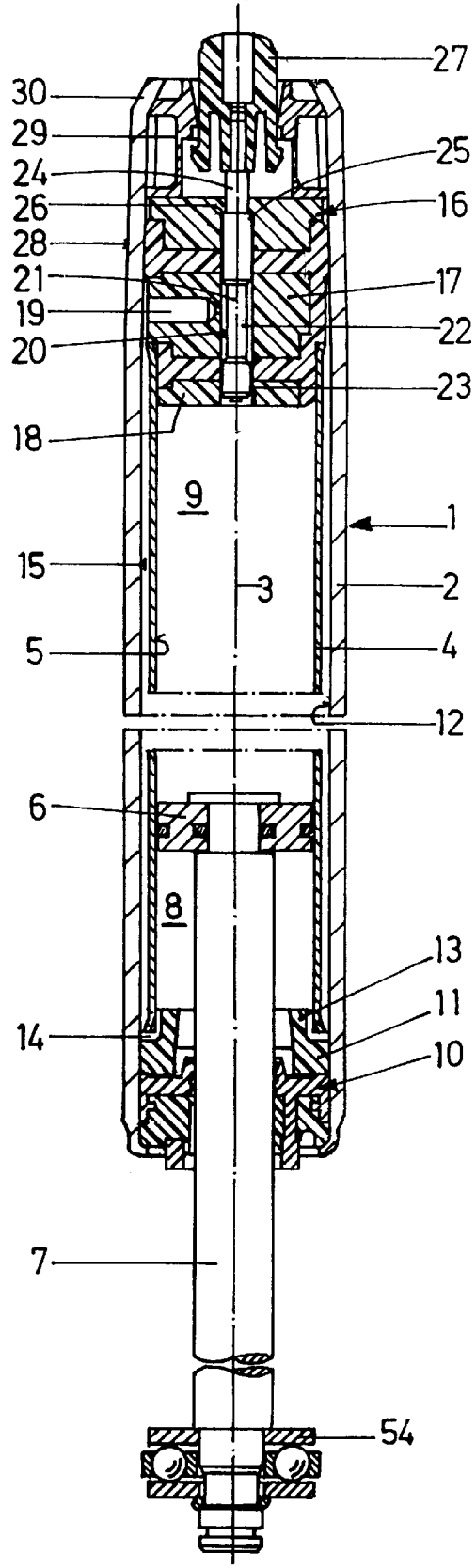
FIG. 1 is a longitudinal section of an adjustable length gas spring.

The adjustable length gas spring seen in FIG. 1 comprises a substantially cylindrical housing 1 which again comprises an exterior cylinder 2 and an interior cylinder 4 disposed concentrically of a joint central longitudinal axis 3. A piston 6 which is attached to the end, inside the housing 1, of a piston rod 7 bears sealingly against the inside wall 5 of the interior cylinder 4. The piston 6 divides the interior cylinder 4 into two housing chambers 8, 9.

At one end of the housing 1, the piston rod 7 is extracted from the latter. At this end, it is guided in a guide and seal unit 10. Towards the neighboring housing chamber 8, provision is made for a centering ring 11 which rests on the unit 10 and which on the one hand, bears against the inside wall 12 of the exterior cylinder 2, thus being centered relative to the axis 3, and which on the other hand, comprises a centering collar 13 which houses the interior cylinder 4 and centers the latter relative to the axis 3. In the direction of the axis 3, the interior cylinder 4 is further supported on the centering ring 11. Passageways 14 are formed in the centering ring 11 and in the centering collar 13, connecting the housing chamber 8 formed between the piston 6 and the guide and seal unit 10 with an annular-gap-type overflow channel 15 formed between the exterior cylinder 2 and the interior cylinder 4.

A valve 16 is disposed in the housing 1 at the end that is opposed to where the piston rod is extracted, i.e. the guide and seal unit 10, its valve box 17 bearing against, and being sealed toward, the inside wall 12 of the exterior cylinder 2 and the inside wall 5 of the interior cylinder 4, the valve 16 supporting the interior cylinder 4 in the direction of the axis 3. The valve box 17 comprises a passageway 19 which is joined to the overflow channel 15 and runs radially to the axis 13 and which can be connected with the housing chamber 9 between the piston 6 and the valve 16 and runs concentrically of the axis 3. For this connection to be produced and blocked, respectively, a valve pin 21 is provided, having a necking 22 which, in the closed condition of the valve 16 seen in the drawing, finds itself totally within the valve channel 20. When the valve pin 21 is pushed in the direction toward the housing chamber 9, the necking 22 bridges a closing portion 23 of the valve 16, whereby a connection is produced between the two housing chambers 8, 9 via the passageway 14, the overflow channel 15, the passageway 19 and the valve channel 20. The valve pin 21 comprises an actuating pin 24 extracted outwards from the valve box 17 and having a diameter that is smaller than that of the valve pin 21 located in the valve box 17. The collar 25 formed where the valve pin 21 passes into the actuating pin 24 bears against a corresponding stop 26 of the box. Since the valve pin 21 diameter d, which is continuously the same as far as to the actuating pin 24 with the exception of the necking 22, corresponds substantially to the diameter D of the valve channel 20, the valve pin 21, for mounting purposes, is simply inserted in the valve 20 from the side allocated to the closing portion 23. It is then protected by the stop 26 against being pushed out.

The end of the actuating pin 24 that is located outside the valve box 17 bears against a slide 27 which is guided and held for displacement in the direction of the axis 3 in a fixing section 28 of the housing 1. To this end, a spacer 29 is disposed in the fixing section 28 and is retained by a bead 30 of the exterior cylinder 2. This spacer 29 also retains the valve 16 in its axial position. The seat support of a chair or an armchair can be mounted on this slightly conical fixing section 28. The slide 27 is operated by means of a lever or the like. The housing chambers 8, 9, the passageway 14, the overflow channel 15, the passageway 19 and the valve channel 20 are filled with pressurized gas and possibly some oil. When the valve 16 is closed, the piston rod 7 can spring together with the piston 6 relative to the housing 1. When the closing portion 23 of the valve 16 is opened by insertion of the valve pin 21 in the direction towards the housing chamber 9, then gas may flow out of the housing chamber 8 on the way described into the housing chamber 9 or vice versa, depending on the force that acts on the piston rod 7 in the direction of the axis 3. The fundamental structure of a gas spring of this type and its operation as a so-called chair gas spring is known with the exception of the design, still to be explained, of the valve 16, for instance from U.S. Pat. No. 3,656,593. Its basic principle of an adjustable length chair column is known for instance from U.S. Pat. No. 3,711,054.

The valve box 17 consists of a valve body 55 of a comparatively hard plastic material, for instance POM (polyoxymethylene) and a sealing member 56 of correspondingly softer material suitable for sealing, for instance NBR (nitrile-butadien rubber (caoutchouc)). The plastic materials are tightly positively connected with each other. Depending on the selection of the plastic materials, the sealing member 56 and the valve body 55 can be welded together when the sealing member 56 is applied to latter by injection-molding. Subsequent welding, for instance by ultrasound, is also possible.

Figure 2:
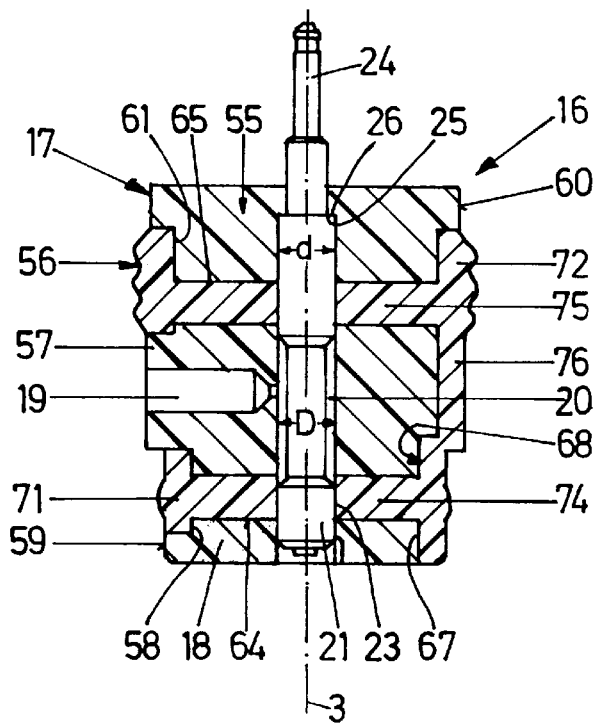
FIG. 2 is a longitudinal section through the valve of the gas spring.

The valve body 55 comprises a greater, substantially cylindrical external section 57 which, with the mounting of the gas spring according to FIG. 1 finished, is allocated to the inside wall 12 of the exterior cylinder 2, having little play. It further comprises the centering collar 18 which is integral with the external section 57. The cylindrical outer surface 59 of the centering collar 18 possesses an annular groove 58. The outer surface 60, turned towards the inside wall 12, of the valve body 55 exhibits an annular groove 61. As seen in FIGS. 1 and 2, the annular grooves 58 and 61 are on both sides of the passageway 19. Annular grooves 62, 63 that are open towards the valve channel 20 are formed in the latter on a cross-sectional plane which—related to the axis 3—is common to them and the annular groove 58 and the annular groove 61. The annular groove 62 is connected with the annular groove 58 via two injection channels 64 diametrical to each other, while the annular groove 63 is connected with the annular groove 61 via injection channels 65 likewise diametrical to each other.

Figure 3:
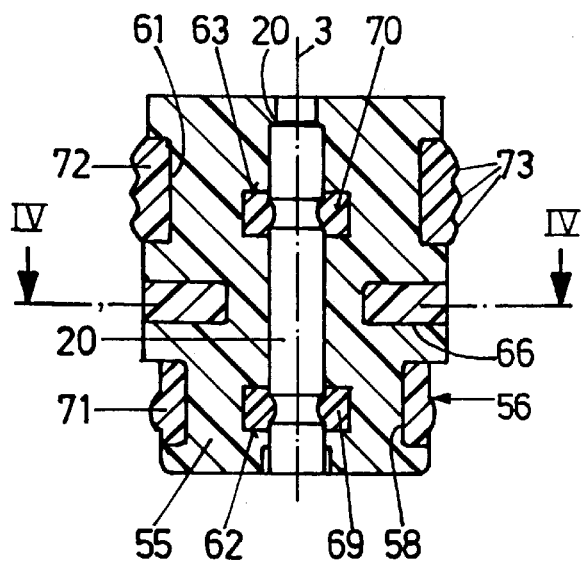
FIG. 3 is a longitudinal section, rotated by 90° as compared with FIG. 2, through the valve box of the valve of FIG. 2.
Figure 4:
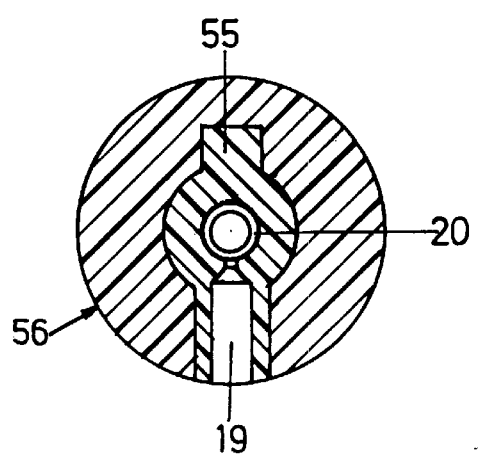
FIG. 4 is a cross-section through the valve box on the line IV—IV of FIG. 3.

As seen in FIGS. 3 and 4, a recess 66 is provided in the valve body 55 parallel to the passageway 19. As seen in FIG. 2, a lengthwise groove 67 is provided as a runner 68 in the outer surface 60 of the external section 57 on the side diametrical to the passageway 19. The valve body 55 is produced integrally in a single phase of operation by injection-molding, and the sealing member 56 is applied to it by injection-molding in the same operation, but in a subsequent phase. A total of four annular seals are produced via the runner 68 which ins parallel to the axis 3. On the one hand, they are two inside seals 69, 70 which are formed in the annular grooves 62, 63 and which slightly project inwards into the valve channel 20 when the valve pin 21 is not mounted. As illustrated in FIGS. 1, 2 and 3, when the valve 16 is closed, the valve pin 21 bears against the inside seals 69, 70 such that the necking 22 finds itself between the inside seals 69, 70. Furthermore, two outside seals 71, 72 are produced, which are formed in the annular grooves 58, 61. The outside seal 72 located in the annular groove 61 is a multi-lipped seal, the sealing lips 73 of which rest sealingly on the inside wall 12 of the exterior cylinder 2, possibly also in the slightly conical fixing section 28. The other outside seal 71 is produced in the annular groove 58, taking its bearing on the inside wall 5 of the interior cylinder 4. The inside seal 69 is connected with the outside seal 71 by webs 74 located in the injection channels 64, while the inside seal 70 is connected with the outside seal 72 via webs 75 located in the injection channels 65. A lengthwise web 76 is formed in the runner 68, connecting the outside seals 71, 72 with each other.

What is claimed is:

1. An adjustable length gas spring, comprising
    a housing (1) formed by an exterior cylinder (2) and an interior cylinder (4) and with a first end and a second end and a central longitudinal axis (3), the exterior cylinder (2) having an inside wall (12) and the interior cylinder (4) having an inside wall (5),
    an overflow channel (15) formed between the interior cylinder (4) and the exterior cylinder (2),
    a piston (6) disposed displaceably in the interior cylinder (4) and dividing the interior cylinder (4) into a first housing chamber (8) and a second housing chamber (9),
    a piston rod (7) mounted on the piston (6) and disposed concentrically of the axis (3) and extending through the first housing chamber (8) and out of the housing (1),
    a piston rod (7) guide and seal unit (10) disposed at the first end of the housing (1) and externally closing the housing chamber (8), at least one passageway (14) permanently connecting the first housing chamber (8) with the overflow channel (15), a valve (16) disposed at the second end of the housing (1) and closing the second housing chamber (9) and provided for optional connection of the second housing chamber (9) with the overflow channel (15), the valve (16) having a valve body (55), which is disposed in the exterior cylinder (2) by an outer surface (60) concentric of the axis (3), which comprises a centering collar (18) concentric of the axis (3) for centering and holding the interior cylinder (4), which, in the outer surface (60), comprises an annular groove (61) with a first outside seal (72) that rests on the inside wall (12) of the exterior cylinder (2), which, in the centering collar (18), comprises a second annular groove (58) with a second outside seal (71) that rests on the inside wall (5) of the interior cylinder (4), which comprises a valve channel (20) concentric of the axis (3), which comprises an annular groove (63) with a first inside seal (70), the annular groove (63) being open towards the valve channel (20) and spaced from the second housing chamber (9), which comprises an annular groove (62) with a second inside seal (69), the annular groove (62) being open towards the valve channel (20) and adjacent to the second housing chamber (9), which comprises a passageway (19) permanently connected with the overflow channel (15) on the one hand and with the valve channel (20) on the other and opening into the valve channel (20) between the first inside seal (70) and the second inside seal (69), and which comprises a valve pin (21) which is displaceable in the valve channel (20) in the direction of the axis (3) towards the second housing chamber (9), and which rests sealingly on the first inside seal (70) and on the second inside seal (69) when the valve is closed, and which bridges the second inside seal (69) and connects the valve channel (20) with the second housing chamber (9) when the valve is opened, wherein the annular groove (61) lodging the first outside seal (72) is connected with the annular groove (63) lodging the first inside seal (70) by at least one first injection channel (65), wherein the annular groove (58) lodging the second outside seal (71) is connected with the annular groove (62) lodging the second inside seal (69) by at least one second injection channel (64), wherein the first outside seal (72) and the first inside seal (70) are connected by a first web (75) in the at least one first injection channel (65), and wherein the second outside seal (71) is connected with the second inside seal (69) by a second web (74) in the at least one second injection channel (64).

2. A gas spring according to claim 1, wherein the at least one first injection channel (65) and the at least one second injection channel (64) are connected with each other by a runner (68).

3. A gas spring according to claim 1, wherein the at least one first injection channel (65) is substantially radial to the axis (3).

4. A gas spring according to claim 1, wherein the at least one second injection channel (64) is substantially radial to the axis (3).

5. A gas spring according to claim 2, wherein the runner (68) is formed in the valve body (55) by a lengthwise groove (67) which is open externally.

6. A gas spring according to claim 1, wherein two first injection channels (65) are provided, extending diametrically to each other.

7. A gas spring according to claim 1, wherein two second injection channels (64) are provided, extending diametrically to each other.

8. A gas spring according to claim 1, wherein the first outside seal (72), the first inside seal (70), the second outside seal (71), the second inside seal (69) and the at least one first web (75) and the at least one second web (74) constitute a one-piece sealing member (56) consisting of a sealant.

9. A gas spring according to claim 1, wherein the valve body (5) consists of a hard elastic plastic material.

10. A gas spring according to claim 1, wherein the inside seals (69, 70) and the outside seals (71, 72) consist of an elastic sealant.

* * * * *